(12) United States Patent
Tägtström et al.

(10) Patent No.: US 6,702,529 B1
(45) Date of Patent: Mar. 9, 2004

(54) CUTTING TOOL FOR PARTING AND SIMILAR OPERATIONS

(75) Inventors: Pär Tägtström, Sandviken (SE); Per Hansson, Gävle (SE); Claes Andersson, Gävle (SE); Börje Ahnlen, Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/890,568

(22) PCT Filed: Jan. 27, 2000

(86) PCT No.: PCT/SE00/00167

§ 371 (c)(1),
(2), (4) Date: Oct. 15, 2001

(87) PCT Pub. No.: WO00/45981

PCT Pub. Date: Aug. 10, 2000

(30) Foreign Application Priority Data

Feb. 2, 1999 (SE) ................................................ 9900356

(51) Int. Cl.$^7$ ........................... B23B 27/04; B23P 15/28
(52) U.S. Cl. ........................................ 407/110; 407/117
(58) Field of Search ................................. 407/110, 117

(56) References Cited

U.S. PATENT DOCUMENTS

| | | | | |
|---|---|---|---|---|
| 4,588,333 A | * | 5/1986 | Gustafson | .................... 407/117 |
| 5,079,979 A | * | 1/1992 | Pano | ............................ 82/158 |
| 5,085,541 A | | 2/1992 | Simpson, III | |
| 5,161,920 A | * | 11/1992 | Zinner | ......................... 407/110 |
| 5,719,859 A | | 2/1998 | Kobayashi et al. | |
| 5,829,924 A | * | 11/1998 | Oshnock et al. | ............. 407/110 |
| 5,833,403 A | * | 11/1998 | Barazani | ..................... 407/101 |
| 5,934,843 A | | 8/1999 | Brask et al. | |
| 6,113,319 A | | 9/2000 | Hansson et al. | |
| 6,139,227 A | * | 10/2000 | Schafer et al. | .............. 407/110 |
| 6,234,727 B1 | * | 5/2001 | Barazani | ..................... 407/117 |
| 6,244,790 B1 | * | 6/2001 | Kingdom et al. | ........... 407/110 |
| 6,250,854 B1 | * | 6/2001 | Pano et al. | ................... 407/110 |
| 6,299,389 B1 | * | 10/2001 | Barazani | ..................... 407/110 |
| 6,428,247 B1 | * | 8/2002 | Friedman | .................... 407/110 |

FOREIGN PATENT DOCUMENTS

| | | |
|---|---|---|
| EP | 0 716 895 | 6/1996 |
| GB | 2 140 718 | 12/1984 |
| WO | WO98/52711 | 11/1998 |

* cited by examiner

Primary Examiner—A. L. Wellington
Assistant Examiner—Brian D. Walsh
(74) Attorney, Agent, or Firm—Burns, Doane, Swecker & Mathis, LLP

(57) ABSTRACT

A parting tool includes a thin holder forming a groove open at one end, and a double-ended cutting insert mounted in the groove. The insert includes front and rear cutting edges and a rear end surface abutting against a rear support surface of the groove. The rear support surface is configured to enable differently shaped double-ended inserts to be mounted therein without the occurrence of contact between the rear cutting edge and a surface of the holder.

4 Claims, 5 Drawing Sheets

CUTTING TOOL FOR PARTING AND SIMILAR OPERATIONS

TECHNICAL FIELD OF THE INVENTION

The present invention relates to a tool for parting or similar turning by operations of the type which includes a holder in the shape of a rather thin disc or disc-shaped member of a first material, such as steel, and a cutting insert of a second harder material, such as cemented carbide, wherein at least the front portion of said holder blade is provided with an outwardly open recess. The recess is mainly defined by a lower bottom surface, an inner or rear wall and an upper wall integral with an elastically flexible arm intended to clamp the insert into its recess, whereby the insert has both upper and lower V-shaped edges intended to cooperate with correspondingly V-shaped ridges or recesses in connection with said recess.

BACKGROUND OF THE INVENTION

During repeated parting and grooving it is of special importance that the tool has a well defined axial support surface against which the rear end of the insert can be supported. It is another demand that the height of said surface is not too large so as to cause damaging surface contact with a zone close to the active corner of the cutting insert in case of using double-ended inserts. One of the drawbacks with the present commonly used blade holders is that they do not provide an appropriate axial support to more than one type of inserts. Each time when the operator needs to change inserts to another type with another type of cutting portion having another inclination angle at the clearance surface below the cutting edge he must also change the blade harder. Hence, there is a need of a new type of blade holder suitable to receive several different types of inserts.

SUMMARY OF THE INVENTION

The present invention relates to a new type of blade holder wherein the insert-receiving recess of the holder comprises a rear axial support with such formation inserts with widely varying inclination angles of the clearance surface below the cutting edge can be received therein.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT OF THE INVENTION

Figure 1:
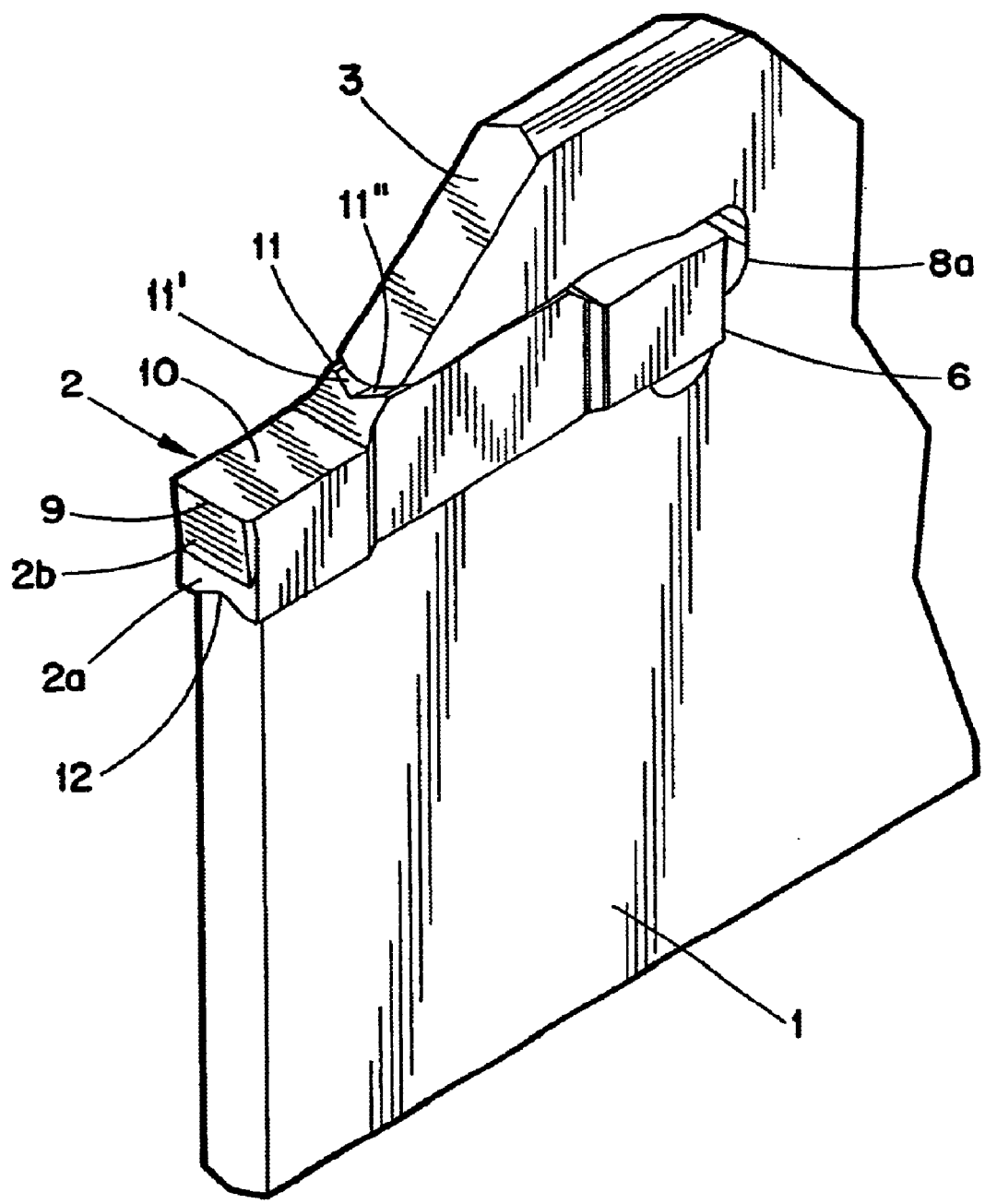
FIG. 1 is a partial perspective view of a cutting tool of the invention with an insert mounted in place in a blade shaped holder.
Figure 3:
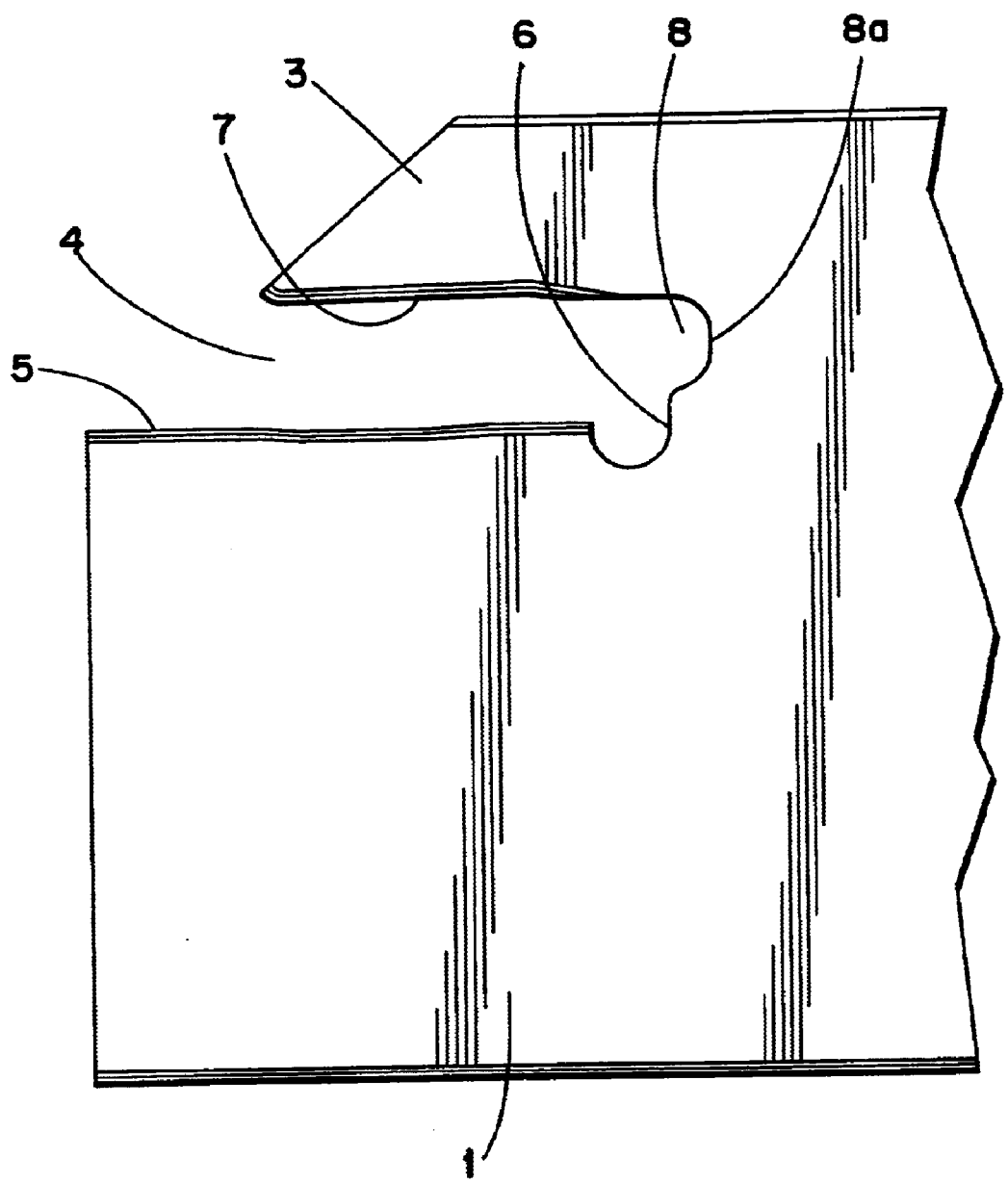
FIG. 3 is a side view of the blade holder of FIGS. 1–2 without any insert.

The parting tool of FIG. 1 comprises a blade type holder, in its entirety designated 1, and a cutting insert 2. The insert 2 can in certain cases be supported against a separate shim plate (not shown). The holder 1 is in the shape of a rather thin disc or blade shaped portion made of steel or similar material. In practice said blade holder is often rectangular, elongated, and has at least one of its opposite ends provided with an upper clamp arm 3 integral with the holder whilst having an outwardly open recess 4 (see FIG. 3) which is mainly confined by a bottom wall 5, an inner or rear wall 6 and an upper wall 7 which is part of the elastic movable clamp arm 3 of said blade holder provided to fasten the insert into its recess. In the embodiment shown as an example in the drawings the blade holder 1 has a slot 8 the end of which is smoothly rounded. The purpose of this slot is to provide a certain amount of elasticity to the clamp arm 3 and to provide a certain space for the cutting edge and the insert portion below said cutting edge on a double-ended insert such that damaging surface contact does not occur. The arm 3 could alternatively, due to its resilience, in a manner known per se, be pivoted downwards towards the bottom wall of the recess by means of a separate clamp screw (not shown).

Figure 2:
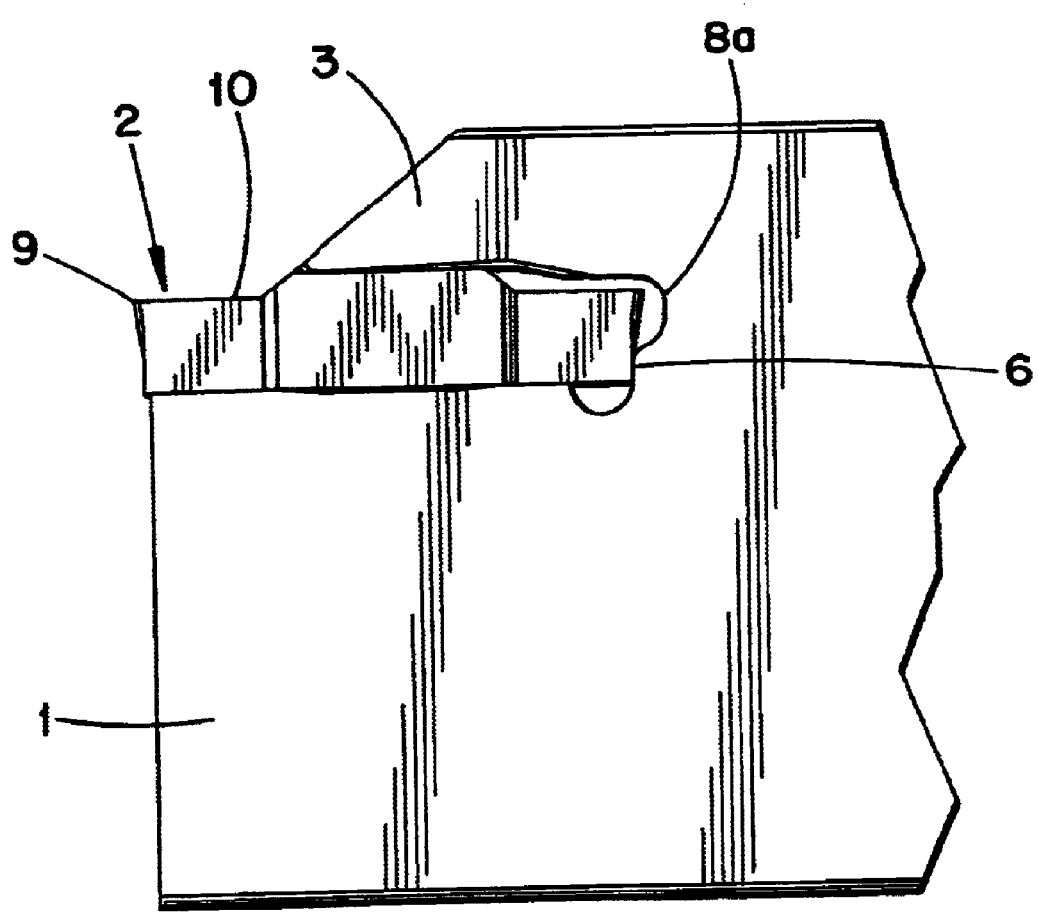
FIG. 2 is a side view of the tool of FIG. 1.

The insert 2 as shown in FIGS. 1–2 is made of a cemented carbide body the front end of which has a main cutting edge 9, next to which there is provided a chip breaker surface 10 on the upper surface of said body. In the area behind the chip breaking portion 10 there is a raised portion of said insert body that is provided with a recess 11 V-shaped in cross-section and divided into forward and rear portions 11' and 11" respectively between which there is a central groove with concave rounded form (not shown). The lower side of said insert body 2 is also provided with a groove 12 V-shaped in cross-section. In practice both grooves on said upper and lower sides could have an identical V-shaped formation.

Although the cutting edge 9 in the example as shown extends perpendicular to the longitudinal extension of the insert, the form and location of the edge could be widely varied. That is, the insert can be provided with circularly rounded or partially rounded edges, and if the edge is straight it could be inclined in relation to the longitudinal extent of the insert.

Figure 4:
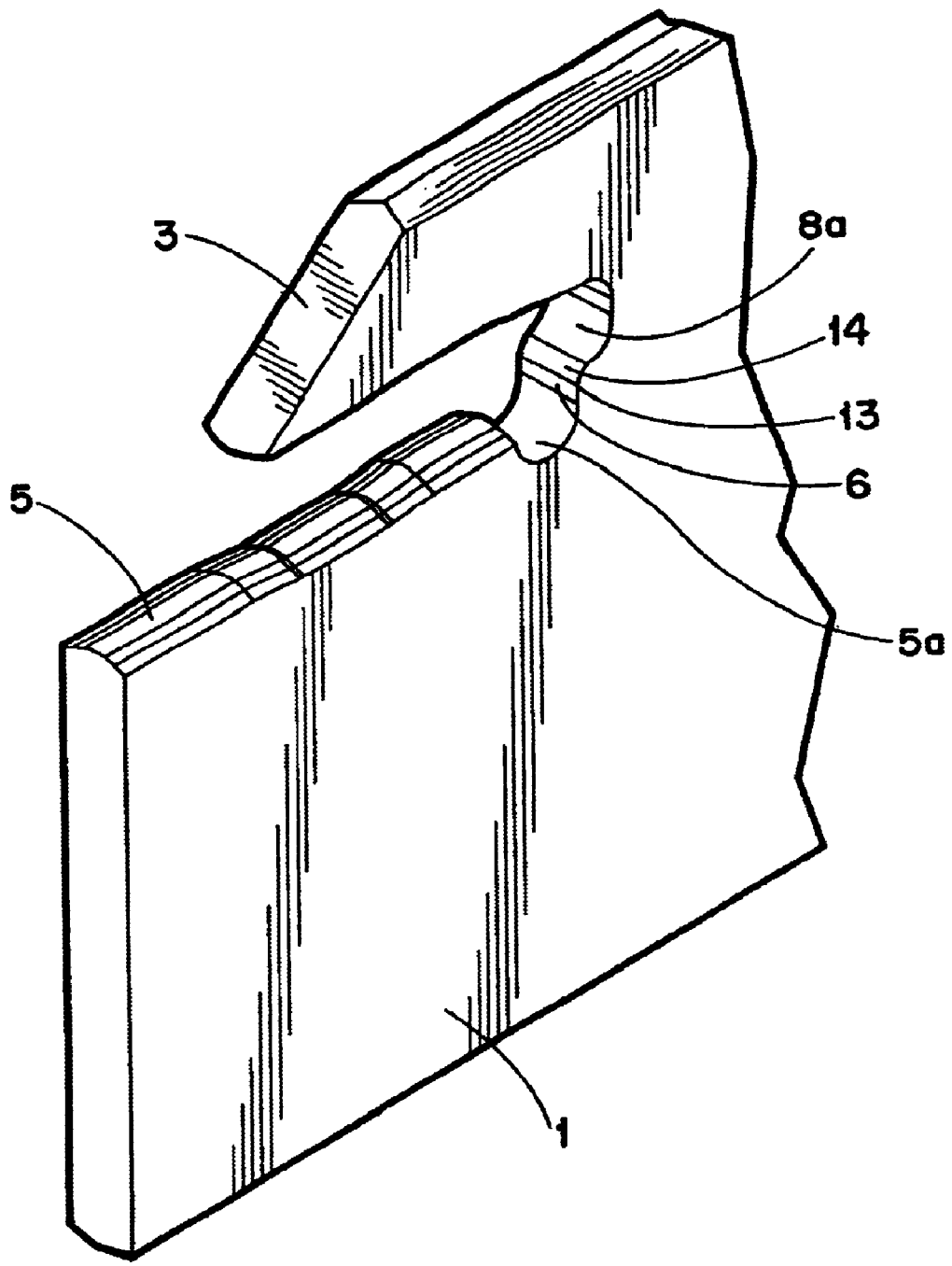
FIG. 4 is a perspective enlarged view of the bottom and inner walls of the insert receiving recess.

According to the invention the straightly upstanding portion of a rear support surface of the insert 2 is arranged to be supported against a rear straightly upstanding wall 6 that is integral with the blade holder in said recess. This support wall 6 extends via a convexly curved surface 14 into a curved end portion 15, 8a made by groove milling into the rear slot 8. The detailed embodiment is preferably such that the rear portion of the bottom wall 5 extends into a milled groove 5a having a smoothly rounded contour, which then extends into the support wall 6 approximately at the inflexion point 13. By this embodiment it is ensured that both the rear, lower and upper edge portions of the insert become freely exposed from, i.e., out of contact with, said blade holder. The upstanding support wall 6 can be planar, preferably with a height less than its width whereby said support wall 6 only needs to have a relatively limited height extension as shown in FIG. 4. Alternatively, however, the rear insert surface 2a that is intended for contact with said support wall 6 could be provided with a V-shaped recess and the support wall 6 can have a male extension such that said extension and said V-shaped groove form a male female joint.

Figure 5:
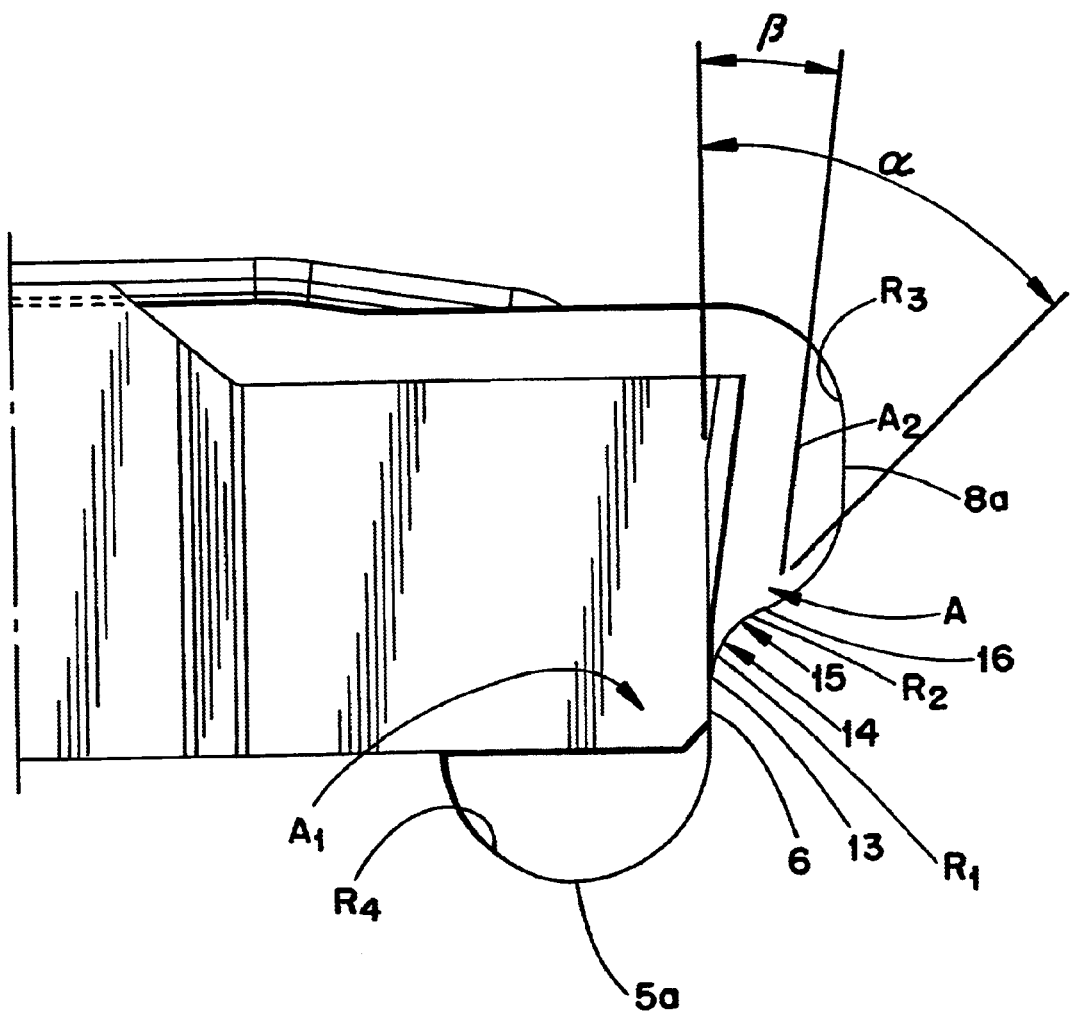
FIG. 5 is an enlarged view showing the insert after being mounted into the tool.

As best appears from FIG. 5, the detailed embodiment is such that the axial support wall 6 extends upwards and extends into a convexly shaped transition surface 14 of relatively large radius $R_1$ which extends into a convex partial surface 15 with essentially smaller radius $R_2$. This partial surface 15 then extends into groove 8 confined by a concave surface 8a with a radius $R_3$ which in this shown embodiment is larger than both above mentioned radii $R_1$ and $R_2$. In certain cases, however, $R_1$ could be larger than $R_3$. The radius $R_3$ ought to be equal to or preferably larger than radius $R_4$ of said groove 5a. Thanks to this embodiment it is possible to receive in the same blade holder the insert 2 shown in FIGS. 1–3 the rear end surface of which comprises a lower end surface 2a on the insert that extends perpendicularly from the bottom wall 5 and an upper clearance surface 2b. This last mentioned clearance surface 2b is hereby freely exposed from the rear support wall 6. In the same holder can also be received an insert with the form having the dashed appearance A as shown in FIG. 5. As appears from FIG. 5 this insert has a form that deviates both in its lower and upper portion. Thus, lower surface portion $A_1$ of said dashed appearance A has an acute clearance angle α that amounts to 45° whereas the upper surface portion $A_2$ has been provided with a substantially smaller clearance angle β. In spite of these geometrical differences this insert can be well received in the same blade holder as the insert shown in FIGS. 1–2. The reason is that the lower sharply inclined clearance surface portion $A_1$ can have an appropriate support against the upper portion of the convexly shaped surface 16. The size of $R_1$ ought to be in the range 0.2–100 mm, preferably 0.5–5 mm whereas $R_2$ ought to be in the range 0–10 mm, preferably 0.2–2 mm. The size of $R_3$ ought to be 0.2–10 mm, preferably 0.2–5 mm whereas the size of $R_4$ ought to be 0.5–5 mm, preferably 1–5 mm.

The number of blade holders can hereby be essentially reduced for a customer that needs a number of differently shaped inserts depending upon which type of grooving and type of workpiece material to be used which is a commonly occurring situation in the machining industry.

Various embodiments of the above example can of course be used within the scope of e invention. For instance, it is not necessary that the support wall 6 extends perpendicularly from the bottom wall 5. Also, it is to be understood that the transition surface 14 can be composed of a number of surface segments with respective radii of varying size.

What is claimed is:

1. Metal cutting tool for parting comprising a thin holder formed of a first material, and a double-ended cutting insert formed of a second harder material, wherein the holder is provided with a forwardly open recess, the recess including a bottom wall, a rear wall, and an upper wall comprising part of an elastically movable clamping arm integral with the holder to frictionally secure the insert in the recess, the insert including upper and lower surfaces engaging the upper and bottom walls, respectively of the recess by respective ridge-and-groove connections of generally V-shaped cross section, the rear wall of the recess defining a support surface including a straightly upstanding upper part against which a straightly upstanding portion of a rear end surface of the insert abuts, the support surface extending upwardly from the bottom wall of the recess, the upper part of the support surface transforming into a first convexly shaped surface having a first radius, the first convexly shaped surface transforming into a second convexly shaped surface having a second radius smaller than the first radius, the second convexly shaped surface transforming into a concavely curved surface which defines a rear end of an extension of the recess.

2. The tool defined in claim 1, wherein a lower portion of the supporting surface transforms into a groove having a smoothly rounded contour, the groove interconnecting the supporting surface with the bottom wall of the recess.

3. The tool according to claim 2, wherein a radius of the concavely curved surface is no smaller than a radius of the groove of smoothly rounded contour.

4. The tool according to claim 3, wherein the rear end surface of the insert includes a V-shaped recess, and the support surface being provided with a corresponding V-shaped extension projecting into the V-shaped recess to form a male-female joint therewith.

* * * * *